Aug. 15, 1961   J. H. ALLISON ET AL   2,995,806
METHODS OF MANUFACTURING WAVEGUIDES
Filed Oct. 3, 1958
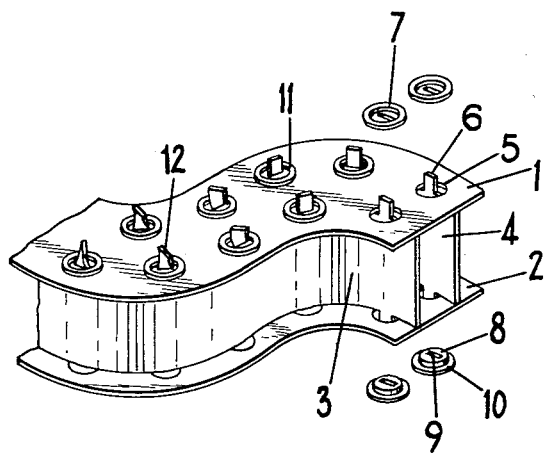
INVENTORS
JAMES HENRY ALLISON
ARTHUR KENNETH FILER
BY
ATTORNEYS

United States Patent Office 2,995,806
Patented Aug. 15, 1961

2,995,806
METHODS OF MANUFACTURING WAVEGUIDES
James Henry Allison, Harrow Weald, and Arthur Kenneth Filer, Stanmore, England, assignors to The General Electric Company Limited, London, England
Filed Oct. 3, 1958, Ser. No. 765,220
Claims priority, application Great Britain Oct. 8, 1957
6 Claims. (Cl. 29—155.5)

This invention relates to methods of manufacturing waveguides, and is particularly concerned with methods which fall within the scope of copending United States patent application Serial No. 679,577.

In the method described in the specification of the above-mentioned patent application with reference to FIGURES 1 and 2 of the drawings filed therewith, a waveguide component is formed by assembling a number of members so that tags with which the side members 9 to 13 are provided pass through slots in the top and bottom members 5 and 6. These tags are then twisted so as to form a structure the members of which are locked together and then the structure is subjected to a brazing process so as to cause contiguous members to be brazed together. In this method it is not only necessary for the slots in the members 5 and 6 to be accurately positioned but also for the inclination of each slot relative to the appropriate member to be correct. This latter requirement presents some difficulty in practice since whereas the position of a slot can be given in cartesian coordinates so that a punched tool can easily be positioned relative to the work piece, it is not so easy to set the work piece at the correct angle relative to the tool, particularly if a large number of different angles are required.

One object of the present invention is to provide a method of manufacturing waveguides in which the above difficulty is overcome.

According to one aspect of the present invention a method of manufacturing a waveguide, which may form part of a waveguide component, comprises the steps of forming a plurality of regularly shaped holes in each of first pair of members which constitute opposite walls of the finished waveguide, forming a second pair of members which constitute opposite walls of the finished waveguide with tags projecting from opposite sides of the centre portion of each member of this pair, assembling the first and second pairs of members so that said tags of the second pair of members project one through each of said holes in the first pair of members, fitting like members one over each tag so as to close the holes in the first members through which the tags project, said further members each comprising a first portion which is regularly shaped so as to enable it to be fitted into any one of said holes for the purpose of closing that hole in a number of different positions, dependent upon the relative positions of the associated tags, and a second portion which lies on the side of the first member into which the first portion of the further member fits remote from the second members, deforming the said tags so that all the said members are locked together, and joining together the said members by brazing to form a unitary structure.

The order of forming and assembling the first and second pairs of members, fitting the further members, and deforming the tags need not be carried out in quite the order stated since, for example, the two members of the second pair of the first pair may be assembled in the required manner and the further members fitted over the appropriate tags which are then deformed to lock together those members before the other member of the first pair is added to the assembly.

Preferably the holes in the first pair of members and the first portion of each of the further members are circular.

The holes in each of the members of the first pair are arranged in two lines and preferably these two lines are not parallel straight lines. One or both of these lines may be curvilinear or alternatively, if both lines are straight, they may be inclined to one another so as to give a tapered waveguide.

According to another aspect of the present invention, the method of manufacturing a waveguide as set out above may be modified by replacing each of at least some of said further members by two separate members which correspond to the said first and second portions of the further members respectively.

One example of a method of manufacturing a waveguide in accordance with the present invention will now be described with reference to the accompanying drawing which shows an isometric view of the waveguide at various stages of its manufacture.

Referring to the accompanying drawing, the waveguide is manufactured from four members 1 to 4 each of which constitutes one wall of the finished waveguide. The members 1 to 4 are formed from sheet metal consisting of a base of an aluminium-manganese alloy which is coated on both sides with an aluminium-silicon alloy. These members are preferably of a material which is sold by Imperial Chemical Industries Limited under the trade name "Kynal" with the code number 1B 16/19.

A plurality of like circular holes, such as the hole 5, are punched in the members 1 and 2. The holes in each of the members 1 and 2 are disposed in two lines which conform approximately to the side walls of the finished waveguide. Each of the members 3 and 4 is formed with a central portion which constitutes the waveguide wall proper and a plurality of tags, such as the tag 6, which project from either side of the central portion.

In the present example, the longitudinal axis of the finished waveguide is curvilinear with the result that the said lines of holes in the members 1 and 2 are also curvilinear. The members 3 and 4 are bent to the shapes they are to have in the finished waveguide and are then assembled with the members 1 and 2 so that the tags, such as the tag 6, project through the corresponding holes, such as the hole 5.

A further member, for example, the member 7, which is of commercially pure aluminium, is then fitted over each tag. Each of these further members consists of a circular portion 8 through which passes a slot 9, and a circular portion 10. When assembled in the manner stated, the portion 8 of each further member just fits into the hole, such as the hole 5, in the appropriate member 1 or 2 while the portion 10 makes contact with the outer surface of the appropriate member 1 or 2. In the drawing the further member 11 is shown in position in this manner.

The tags projecting through the further members, such as the member 11, are then each twisted through approximately 45° so as to hold the further members captive. The tag 12 is shown in the drawing twisted in this manner and it will be appreciated that this twisting operation causes the members 1 to 4 and the further members all to be locked together. Instead of twisting the tags, such as the tag 12, to lock the members together, they may be deformed in the manner described in the aforementioned specification with reference to FIGURE 7 of the drawings accompanying that specification.

The resulting structure is then cleaned in known manner, for example by first dipping in an alkaline bath which may be an aqueous solution of sodium hydroxide, rinsing in water, and then dipping in an acid, which may be dilute nitric acid, to remove any remaining traces of alkaline and any copper that may be present. If the structure as assembled is clean, chemical cleaning may be replaced by a degreasing treatment in a suitable vapour such as trichlorethylene.

After cleaning the structure is preheated in an oven to a temperature of approximately 540° C. The structure is then taken quickly from this oven and plunged into a bath of molten "Kynal" brazing flux. This causes the aluminium-silicon coating of the members 1 to 4 to flow with the result that when the structure is removed from the bath, these members and the further members, such as the member 7, are then brazed together.

The resulting structure is then cleaned in known manner to remove any remaining brazing flux. This may be done by washing in boiling water to dissolve way remains of the flux and then dipping the structure in an acid bath, for example dilute nitric acid. After rinsing the structure is inspected for residual flux and if necessary, the previous steps are repeated.

The method of manufacturing a waveguide described above may be modified by replacing each of the further members, such as the member 7, by two separate members. Each of these separate members is a circular washer having a slot through it for the passage of the appropriate tag and one of the members corresponds to the portion 8 so that it fits entirely into the appropriate hole in the member 1 or 2 while the other member corresponds generally to the portion 10.

It is to be understood that the present invention is not restricted to the manufacture of waveguides using material that is coated with an alloy having a relatively low melting point. For example, in the method described above with reference to the accompanying drawing, the members 1 to 4 may be of uncoated aluminium, the necessary brazing metal then being provided in the form of pieces of aluminium-silicon foil that are placed between the members that are to be brazed together during assembly. Alternatively the brazing metal may be applied in the form of a paste. In either case the assembled structure is placed in a brazing bath as before.

We claim:

1. A method of manufacturing a waveguide of rectangular cross-section comprising the steps of: providing a first pair of members which constitute opposite walls of the finished waveguide, providing a second pair of members which constitute opposite walls of the finished waveguide, forming in each of the first pair of members, a plurality of regularly shaped holes which lie along two lines at least one of which is curved, forming tags which are of elongated cross-section and which project from opposite sides of the center portion of each member of the second pair of members, assembling the first and second pairs of members so that said tags of the second pair of members project one through each of said holes in the first pair of members, providing a plurality of like closure members each comprising a first portion of regular shape fittable into said holes of the first pair of members in a number of different positions dependent upon the relative positions of the associated tag, each said closure member further comprising a second portion having a transverse dimension in excess of the diameter of the holes and each said closure member having a through slot of elongated cross-section approximately matching the cross sectional contour of the tags, fitting said closure members one over the projecting end of each tag with the first portion within and closing the associated hole in the first member through which the tag projects, with the second portion disposed on the side of the first member remote from the second members and with the tag projecting through the slot in the closure member, deforming the tag so that all the members are locked together, and finally joining together all the members by brazing to form a unitary structure.

2. A method of manufacturing a waveguide according to claim 1 wherein the said holes in the first pair of members and the first portion of each of the further members are circular.

3. A method of manufacturing a waveguide according to claim 1 wherein the first and second pairs of members are of material having a base of a first metal or alloy and a coating on one or both sides of the base of a second metal or alloy (which has a lower melting point than the first metal or alloy) and the members are joined together as aforesaid by heating the members so as to cause the second metal or alloy to flow thereby brazing the members together.

4. A method of manufacturing a waveguide according to claim 1 wherein the said tags are deformed by twisting.

5. A method of manufacturing a waveguide according to claim 1 with the modification that each of at least some of the said further members are replaced by two separate members which correspond to the said first and second portions of the further members respectively.

6. A method of manufacturing a waveguide of rectangular cross-section comprising the steps of: providing a first pair of members which constitute opposite walls of the finished waveguide, providing a second pair of members which constitute opposite walls of the finished waveguide, forming in each of the first pair of members a plurality of circular holes which all have the same diameter and which lie along two lines at least one of which is curved, forming tags which are of elongated cross-section and which project from opposite sides of the center portion of each member of the second pair of members, assembling the first and second pairs of members so that said tags of the second pair of members project one through each of said holes in the first pair of members, providing a plurality of like closure members each comprising a first circular portion fittable into said holes of the first pair of members and a second portion having a transverse dimension in excess of the diameter of the holes and each said closure member having a through slot of elongated cross-section approximately matching the cross-sectional contour of the tags, fitting said closure members one over the projecting end of each tag with the first portion within and closing the associated hole in the first member through which the tag projects, with the second portion disposed on the side of the first member remote from the second members and with the tag projecting through the slot in the closure member, the slots through some of the closure members then being non-parallel to the slots through other such members, deforming the tag so that all the members are locked together, and finally joining together all the members by brazing to form a unitary structure.

References Cited in the file of this patent

UNITED STATES PATENTS

| | | |
|---|---|---|
| 2,215,318 | Bristol | Sept. 17, 1940 |
| 2,258,681 | Hoglund | Oct. 14, 1941 |
| 2,505,424 | Moseley | Apr. 25, 1950 |
| 2,560,290 | Helberg | July 10, 1951 |
| 2,620,539 | Poupitch | Dec. 9, 1952 |
| 2,722,625 | Bingeman et al. | Nov. 1, 1955 |